Aug. 14, 1945.  E. C. HORTON  2,382,633
GAUGE
Filed July 19, 1943
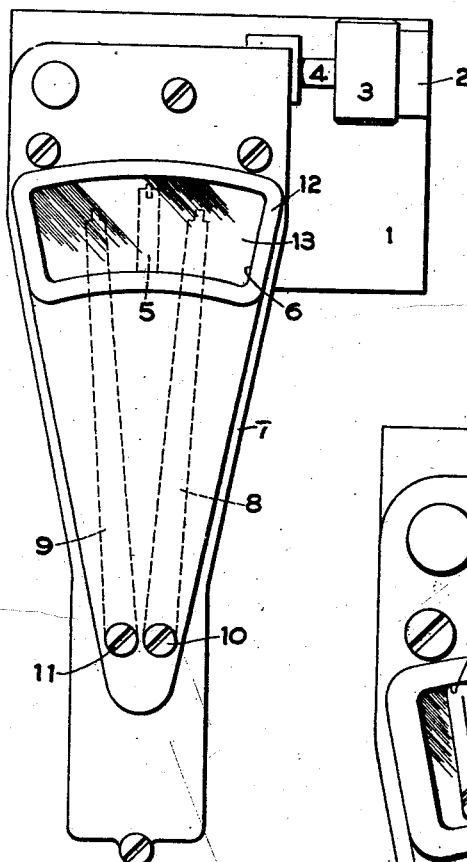
FIG. 1
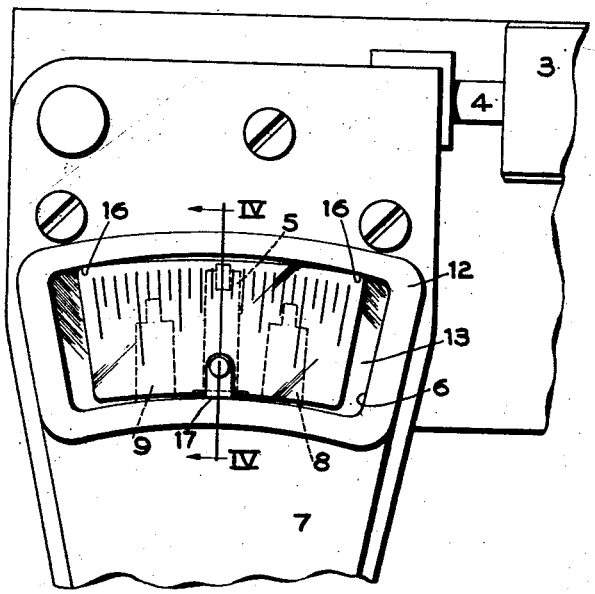
FIG. 4
FIG. 2
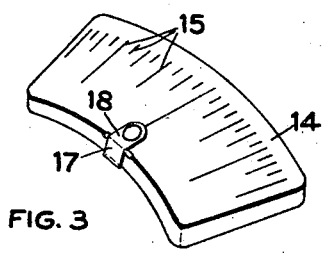
FIG. 3
INVENTOR
ERWIN C. HORTON
BY
Beau, Brooks, Buckley & Beau
ATTORNEY Patented Aug. 14, 1945

2,382,633

UNITED STATES PATENT OFFICE 2,382,633

GAUGE

Erwin C. Horton, Hamburg, N. Y., assignor to Trico Products Corporation, Buffalo, N. Y.

Application July 19, 1943, Serial No. 495,296

5 Claims. (Cl. 33—125)

The present invention relates to micrometer gauges and particularly to the comparator type of gauge by the use of which the product of mass production methods is compared to perfect masters. The masters are initially made with the utmost care and at great expense and are much desired for best results, but in certain instances it is found that the expense of making masters is not warranted and that practically perfect workpieces at hand may be duplicated within reasonable tolerances and be acceptable.

Furthermore in a comparator gauge where workpieces are tested in rapid order, there is less eye fatigue where the sight window of the instrument is plain and free of scale marking of any kind.

The object of the present invention is to maintain a clear window for comparator gauging while at the same time making temporary provision for facilitating the setting of the tolerance indicator or indicators when desired. The invention therefore has for its aim to provide a comparator gauge with a removable scale insert for setting the tolerance indicators which scale insert may thereafter be displaced so as to give clear vision through the sight window.

Furthermore, the invention has for its object to provide a novel scale insert for use with gauges of the comparator type to facilitate the setting of the tolerance indicators in a practical and efficient manner.

In the drawing:

Fig. 1 is a plan view of a micrometer gauge for which the present invention is especially adapted;

Fig. 2 is an enlarged fragmentary plan of the instrument showing the scale insert in position thereon;

Fig. 3 is a perspective view of the scale insert; and

Fig. 4 is a cross sectional view of the insert taken about on line 4—4 of Fig. 2.

Referring more particularly to the drawing, the micrometer gauge herein comprises a base 1 having an anvil 2 against which a practically perfect workpiece 3 is held by the plunger 4. The plunger is connected by motion amplifying means (not shown) for impressing the dimensional characteristic of the workpiece on the dimensional pointer 5 appearing in the sight window 6 of the boxlike housing 7. A pair of plus and minus tolerance indicators 8 and 9 are fixed on pivoting studs 10 and likewise appear through the sight opening or window 6 for association with the pointer 5. All of this gauge construction is more fully set forth in Patent No. 2,362,203.

By inserting a screw driver in the kerf 11 of each stud 10, the free or outer end of the indicator may be adjusted with respect to the pointer. For example, if the workpiece 3 causes the pointer 5 to rest in the position shown in Fig. 1, and it is desired to accept as usable duplicates of this workpiece up to within two-thousandths of an inch variation, plus or minus, then the tolerance indicators are set on the opposite sides of the poised pointer at a distance equal to the tolerance allowed.

The window 6 is framed by a raised border rim 12 which overhangs a glass cover plate 13. The cover plate is free of any graduations so as to facilitate the reading of the gauge in the capacity of a comparator by merely observing the relation of the dimensional pointer with respect to the tolerance indicators.

According to the present invention, a removable and preferably transparent scale insert or block is provided for temporary placement in or over the window to enable the correct setting of the tolerance indicators therebeneath, following which the scale insert is removed for an easy reading of the comparator gauge. The transparent scale insert illustrated comprises a plate 14 of transparent glass or plastic, and adjacent its outer edge the plate is provided with a series of scale graduations 15 preferably arranged on the underface and in arcuate formation to overlie the path of the swinging dimensional pointer. The scale plate is designed to fit within the rim 12 for frictional securement while setting the indicators. This frictional securement is obtained in a practical manner to enable ready placement and removal of the insert, as by reducing the surface contact with the rim through the provision of point contacts. To this end the outer corners 16 are designed to engage the rim at one side while a third contact point 17 at the opposite side engages the opposing rim portion intermediate the bearing points 16. This provides in effect a tri-point engagement. The third contact point may be in the form of a resilient lug or detent as provided by the angular extension of a flat spring 18. A fastener 19 secures the flat spring to the top surface of the insert with the detent part 17 overhanging the margin thereof, as shown clearly in Fig. 4.

Where the sight window is arcuate in design the spaced bearing contacts 16 may be produced with economy by shaping the outer edge of the scale plate on a greater radius. Similarly the third point may be provided by generating the inner edge of the plate about a common axis with the outer edge. With both the inner and outer edges of the insert being of greater radius than the inner and outer edges of the window, a simple construction is provided which will enable ready placement and displacement of the scale insert, and by reason of the spring detent 17 a frictional fit is effected which will permit the placement of the scale insert in a desired position within the window.

Preferably, the circumferential extent or length of the insert is less than that of the window to enable the scale plate being shifted therein for registering a selected scale graduation with the pointer to facilitate the setting of the tolerance indicators on each side thereof. After the setting has been made, the scale insert is removed to afford clear vision through the sight opening unobscured by the presence of any lines or mark of calibration. The scale insert is practical in construction and use since it avoids the necessity of going to great expense in producing a master workpiece where an acceptable and practically perfect workpiece will serve for all practical purposes. Its use is simplified because of its sliding adjustment which enables selected graduations being moved sidewise to overlie the pointer when not poised exactly in the center.

While the foregoing description has been given in detail, it is not intended thereby to limit the invention since the inventive principles involved may assume other physical embodiments without departing from the spirit or scope of the invention claimed.

What is claimed is:

1. An accessory to facilitate the setting of a tolerance indicator with respect to a pointer in a sight window of a comparator gauge wherein the window is normally free from scale graduations, comprising a transparent body adapted to be placed in superimposed relation to the window in a predetermined definite relation thereto, the body having a series of graduations thereon for association with the indicator and pointer to relate the former to the latter.

2. A gauge having a removable accessory to facilitate the setting of a tolerance indicator with respect to a dimensional pointer in a sight window, the latter closed by a glass cover plate overhung by a border rim having substantially concentric sides, said accessory comprising a scale insert in the form of a flat transparent body seating upon the glass cover plate and frictionally engaged with the border rim, the flat body bearing scale graduations, and a spring detent serving to detachably hold the body in position.

3. A gauge having a removable accessory to facilitate the setting of a tolerance indicator with respect to a dimensional pointer in a sight window, the latter closed by a glass cover plate overhung by a border rim having substantially concentric sides, said accessory comprising a scale insert in the form of a flat transparent body seating upon the glass cover plate and frictionally engaged with the border rim, the flat body bearing scale graduations, the body having substantially concentric sides struck on a relatively greater radius whereby its outer edge will engage the border rim at spaced points and its inner edge will engage the border rim at a single intermediate point.

4. A gauge having a removable accessory to facilitate the setting of a tolerance indicator with respect to a dimensional pointer in a sight window, the latter closed by a glass cover plate overhung by a border rim, said accessory comprising a scale insert in the form of a flat transparent body seating upon the glass cover plate bearing scale graduations, and a spring leaf fastened to the top face of the body and having an angularly extending lip overhanging the side of the body to frictionally engage the border rim.

5. A gauge having a removable accessory to facilitate the setting of a tolerance indicator with respect to a dimensional pointer in a sight window, the latter closed by a glass cover plate overhung by a border rim, said accessory comprising a scale insert in the form of a flat body seating upon the glass cover plate and slidably engaging a pair of substantially parallel sides of the rim for adjustment within the window in the direction of pointer movement whereby to permit scale graduations on the body being selectively related to the pointer when poised by a workpiece.

ERWIN C. HORTON.